(12) United States Patent
Kapfer et al.

(10) Patent No.: US 7,004,743 B2
(45) Date of Patent: Feb. 28, 2006

(54) INSTALLATION FOR THE TREATMENT AND FURTHER PROCESSING OF THERMOPLASTICS AND METHOD FOR THE OPERATION THEREOF

(75) Inventors: Klaus Kapfer, Leonburg (DE); Daniel Schwendemann, Gerlingen (DE)

(73) Assignee: Krupp Werner & Pfleiderer GmbH & Co. KG, (DE)

( * ) Notice: Subject to any disclaimer, the term of this patent is extended or adjusted under 35 U.S.C. 154(b) by 386 days.

(21) Appl. No.: 09/832,632

(22) Filed: Apr. 11, 2001

(65) Prior Publication Data

US 2002/0020932 A1    Feb. 21, 2002

(30) Foreign Application Priority Data

May 4, 2000 (DE) ............................... 100 21 730

(51) Int. Cl.
*B29C 47/92* (2006.01)
(52) U.S. Cl. ...................... 425/166; 425/113; 425/587
(58) Field of Classification Search ............... 425/587, 425/113, 163, 166
See application file for complete search history.

(56) References Cited

U.S. PATENT DOCUMENTS

| | | | |
|---|---|---|---|
| 2,627,087 A * | 2/1953 | Hendry ...................... 264/40.1 |
| 3,746,489 A | 7/1973 | Rizzi et al. .................. 425/205 |
| 3,865,528 A * | 2/1975 | Roess ......................... 425/145 |
| 4,449,913 A | 5/1984 | Krishnakumar et al. .... 425/548 |
| 4,678,420 A | 7/1987 | Inoue ......................... 425/144 |
| 4,867,665 A | 9/1989 | Wada |
| 4,925,381 A * | 5/1990 | Aoki et al. .................. 425/145 |
| 4,959,001 A * | 9/1990 | Langlois et al. ............. 425/147 |
| 5,127,450 A | 7/1992 | Saatkamp ....................... 141/9 |
| 5,591,384 A | 1/1997 | Abrams et al. ............. 264/40.5 |
| 5,879,602 A | 3/1999 | Scheuring |
| 6,042,260 A | 3/2000 | Heidemeyer et al. |
| 6,190,601 B1 * | 2/2001 | Nakamura .................. 264/443 |

FOREIGN PATENT DOCUMENTS

| | | |
|---|---|---|
| DE | 40 21 922 | 1/1992 |
| DE | 38 33 776 | 11/1995 |
| DE | 0 706 873 | 4/1996 |
| DE | 198 48 124 | 4/2000 |
| EP | 0 461 365 | 4/1991 |
| GB | 1517851 | 7/1978 |
| WO | WO 01/54877 A1 | 8/2001 |

OTHER PUBLICATIONS

Fisher, E.G., Maslen, W.A.; Preplasticizing in injection moulding. In:., In: British Plastics, Sep. 1959, S.417-424.
German Search Report.
Anlage 1, zur Mitteilung uber die ermittelten Druckschriften, gemaB Sec. 43 des Patentgesetzes.
Search Report for Companion EU Case 01107124.8-1253.

* cited by examiner

Primary Examiner—Duane Smith
Assistant Examiner—Emmanuel S. Luk
(74) Attorney, Agent, or Firm—James B. Conte; Barnes & Thornburg LLP

(57) ABSTRACT

An installation for the treatment and further processing of thermoplastics comprises a screw-type compounding unit, downstream of which is disposed an intermittently drivable processing unit. Provision is made for a control unit which is connected with a drive of the screw-type compounding unit and with the drive of a metering device and with a drive of the processing unit. The control unit is designed for triggering the drives by the cycle time of the processing unit, the drives having identical run-up times and identical deceleration times.

9 Claims, 3 Drawing Sheets

INSTALLATION FOR THE TREATMENT AND FURTHER PROCESSING OF THERMOPLASTICS AND METHOD FOR THE OPERATION THEREOF

BACKGROUND OF THE INVENTION

1. Field of the Invention

The invention relates to an installation for the treatment and further processing of thermoplastics and a method for the operation thereof.

2. Background Art

Screw-type compounding units, which are available in installations of the generic type and in which are treated the thermoplastics that are to be further processed, have so far always been operated continuously. In this case, the plastics, for instance in the form of pellets, are being supplied, melted and mixed with additives, fillers and reinforcing agents, for instance glass rovings. On the other hand, downstream processing units, for instance presses or injection molding machines, are operated intermittently i.e., discontinuously in an intermittent mode of operation.

Because of these different modes of operation, it is not possible to combine these processing units with screw-type compounding units such that one-heat processing of the plastic material, which has been melted and treated in the screw-type compounding unit, may take place i.e., without intermediate cooling and renewed heating. However, in the manufacture of sheets or films, one-heat manufacture is possible and known i.e., the direct continuous further processing of the plastic material treated and melted in the screw-type compounding unit.

SUMMARY OF THE INVENTION

It is an object of the invention to embody an installation of the generic type and a method for the operation thereof such that intermittent one-heat processing of the molten and treated plastic material is feasible.

According to the invention, this object is attained in an installation for the treatment and further processing of thermoplastics, comprising a screw-type compounding unit, which has a housing, at least one screw disposed in the housing, an electric motor coupled with the at least one screw, and at least one metering device with a metering motor; a processing unit directly downstream of the screw-type compounding unit and intermittently drivable at a cycle time $t_T$, which has a drive to be actuated at a cycle time $t_T$, and a control unit, which is connected with the electric motor that serves for actuation of the at least one screw, with the metering motor of the at least one metering device and with the drive of the processing unit, and which is formed for triggering the electric motor and the at least one metering motor by the cycle time $t_T$ of the processing unit. The gist of the invention resides in that the screw-type compounding unit with its peripheral aggregates such as metering devices is operated intermittently too in precisely the cycle time of the processing unit. For the screw-type compounding unit to work trouble-free and the molten and treated plastic material always to have the same temperature and quality, it is of special advantage when the control unit is formed such that the electric motor for actuation of the at least one screw and the at least one metering motor have identical run-up times $t_H$ and/or identical deceleration times $t_B$.

Contrary to the prior art, short cycle times are possible in the operation of the screw-type compounding unit.

The object according to the invention is further attained by a method according to which the electric motor and the at least one metering motor are triggered by the cycle time $t_T$ of the processing unit.

Further features, advantages and details of the invention will become apparent from the ensuing description of two exemplary embodiments, taken in conjunction with the drawing.

DESCRIPTION OF THE PREFERRED EMBODIMENTS

Figure 1:
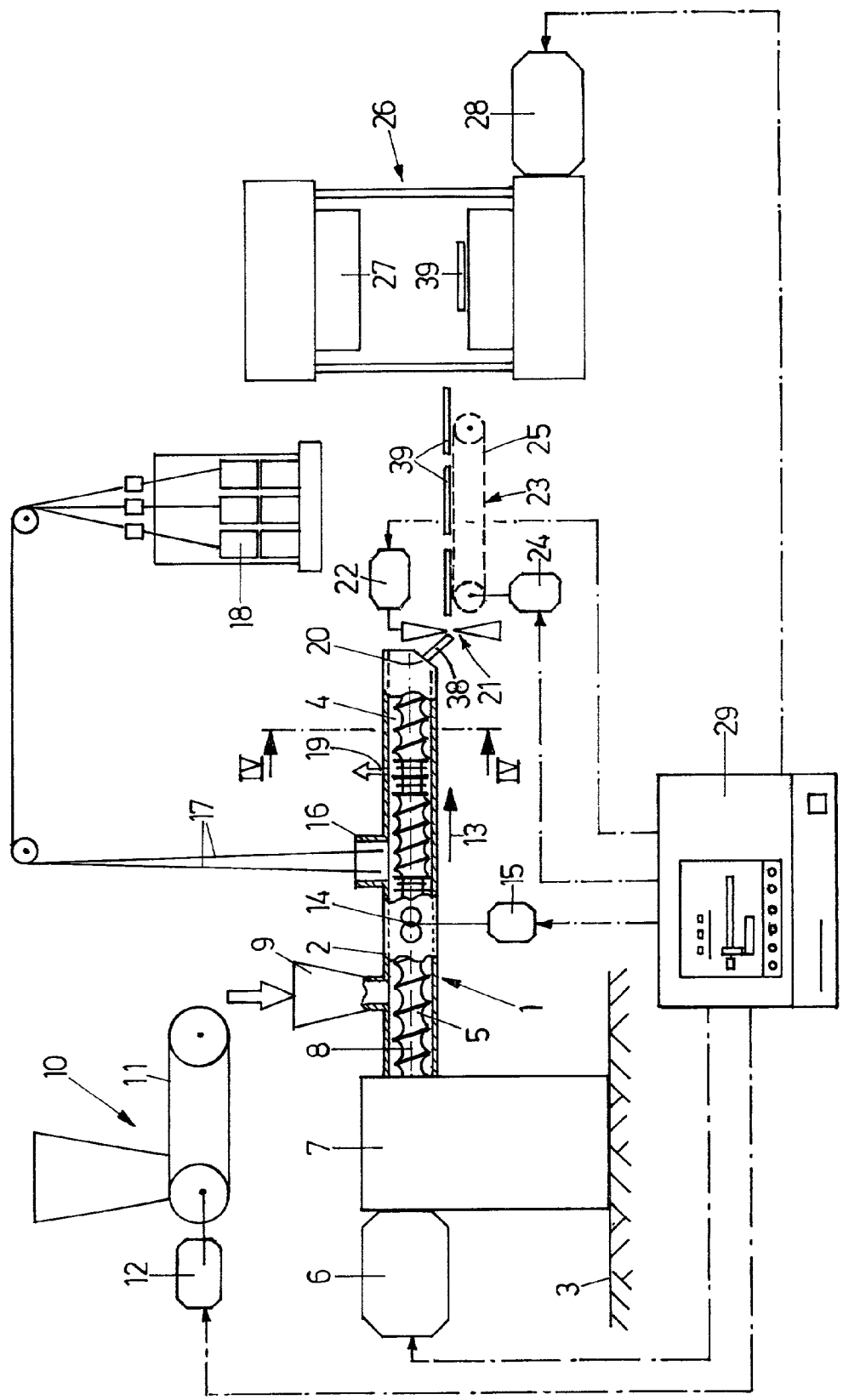
FIG. 1 is an illustration of an installation according to the invention with a press as a processing unit.

The installation seen in FIG. 1 comprises a twin-screw extruder 1 as a screw-type compounding unit, the housing 2 of which supports itself on a foundation 3. Two screws 5, 5' are disposed in bores 4, 4' that are provided in the housing 2. The screws 5, 5' are driven in rotation about their respective axis 8, 8' by an electric motor 6 via a branching gearing 7.

A feed hopper 9 is disposed at the upstream end of the housing 2 for plastic material to be treated which is supplied to the hopper 9 via a first metering device 10. The first metering device 10 may be a proportioning belt weigher, the continuous weighing belt 11 of which is drivable by a first metering motor 12. In the conveying direction 13 of the screws 5, 5', the feed hopper 9 is followed by a second metering device 14 which opens into the housing 2. This may be a metering twin-screw. It is driven by a second metering motor 15.

Downstream of the second metering device 14 in the conveying direction 13, provision is made for an inlet 16 for continuous rovings 17; the rovings 17 are unwound from coils 18 and fed through the inlet 16 into the housing 2. A vent 19 is provided downstream of this inlet 16.

At the downstream end of the housing 2, provision is made for a die head 20 which is again followed by a cutting unit 21 which is drivable by an electric cutting drive 22. A conveying device 23 is allocated thereto, having a conveyor belt 25 to be driven by an electric motor 24. Downstream of the conveying device 23, provision is made for a press 26 as a processing unit. The press 26 has a male mold 27 which is customarily actuated hydraulically, hydraulic supply taking place via a hydraulic pump that is drivable by means of an electric motor 28. The press 26 works intermittently.

The twin-screw extruder 1 is known for instance from U.S. Pat. No. 6,042,260. The feed of the rovings 16 is also known, namely from U.S. Pat. No. 5,879,602.

The motor 6 for actuation of the screws 5, 5', the first metering motor 12 for actuation of the first metering device 10, the second metering motor 15 for actuation of the second metering device 14, the electric cutting device 22, the electric motor 24 for actuation of the conveying device 23 and the electric motor 28 for actuation of the press 26 are triggered by a common control unit 29, with which they are connected via control lines illustrated by dot-dashed lines.

Figure 2:
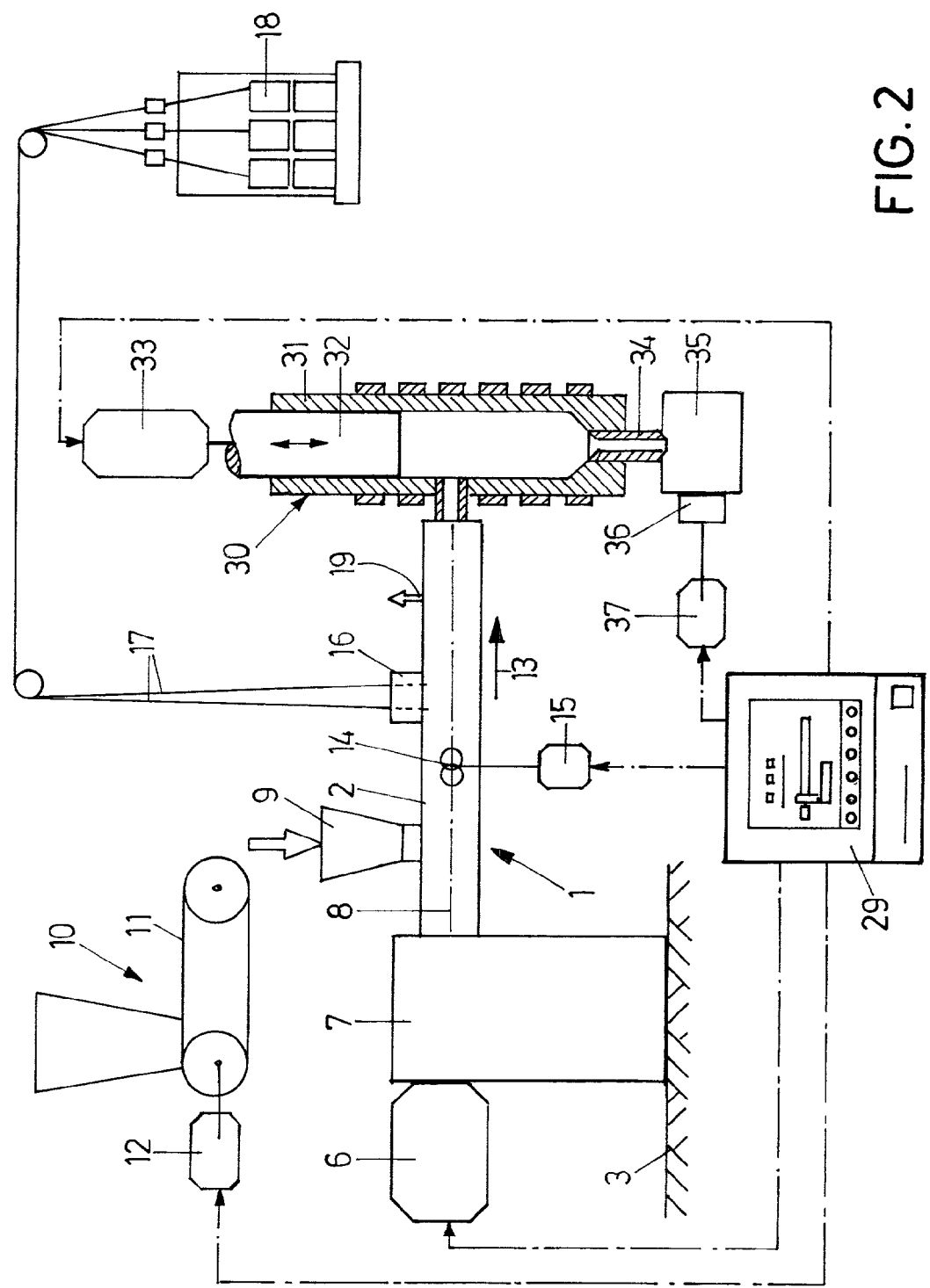
FIG. 2 is an illustration of an installation according to the invention with an injection molding machine as a processing unit.

In the embodiment according to FIG. 2, the extruder 1 is embodied in the same way as in the exemplary embodiment according to FIG. 1. It is followed by a processing unit in the form of a plunger-injection molding machine 30 which has an injection cylinder 31 which is joined to the housing 2 and in which an injection plunger 32 is disposed for intermittent actuation. The injection plunger 32 is customarily driven hydraulically. For actuation of an associated hydraulic pressure supply unit, provision is made for an electric motor 33 which is also triggered by the control unit 29. From the injection cylinder 31, a die 34 opens into an injection mold 35, the ejection device 36 of which is actuated by an ejection drive 37 which can equally be triggered by the control unit 29.

The mode of operation of the installations according to FIGS. 1 and 2 is explained in the following, taken in conjunction with FIG. 3, which shows the speeds n of the motors 6, 12, 15 over the time t. By means of the first metering device 10, a polymer, for instance in the form of pellets, is supplied to the extruder 1 and sheared by the screws 5, 5' and melted by the supply of heat. By means of the second metering device 14, a filler, for instance talcum, is added. Furthermore, glass rovings 17 are supplied through the inlet 16, fed into the extruder 1 and gently cut into long fiber sections. Degassing of the compounded polymer that is extruded takes place through the vent 19. Compounding in the extruder 1 is continuous on principle, whereas the further processing on the downstream processing units is discontinuous. In the embodiment according to FIG. 1, the plastic material discharged as a melt strand 38 is cut by the cutting unit 21 and, in the form of melt sheets 39, intermittently supplied to the press 26 where the sheets are formed in usual manner.

For the sheets 39 to be manufactured corresponding to the cycle of the press 26, also the extruder 1 with of the associated units is operated intermittently, i.e. if only a single melt sheet 39 is to be produced by being cut off the melt strand 38, then a single melt strand 38 is extruded. The screws 5 and the first metering device 10 and the second metering device 14 are actuated only when a melt strand 38 is to be extruded that is necessary for the production of a melt sheet 39.

Figure 3:
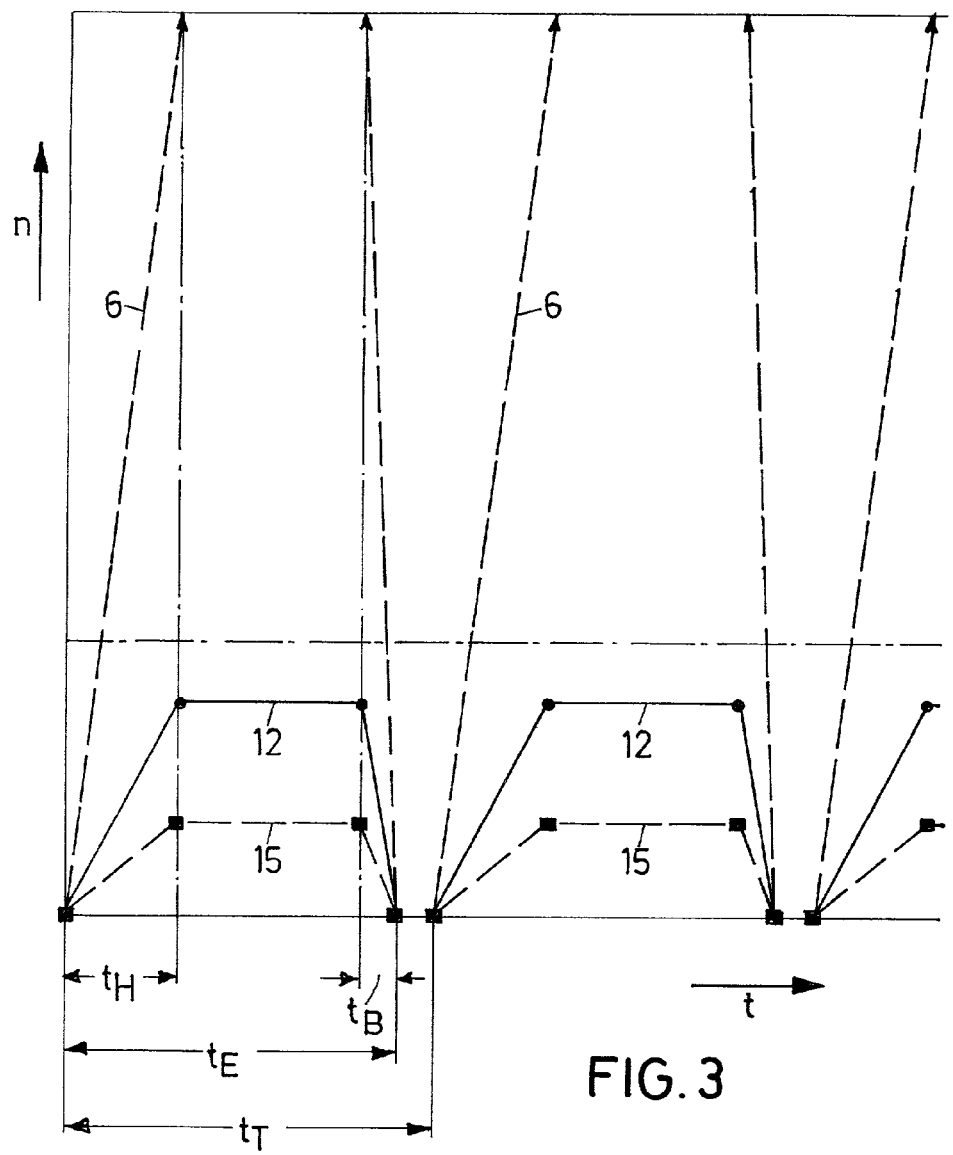
FIG. 3 is an operation diagram of the installation with the speeds plotted over the time.
Figure 4:
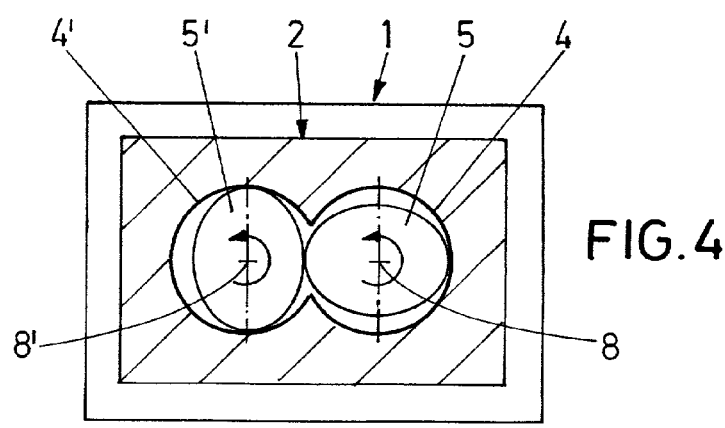
FIG. 4 is a cross-sectional view through the extruder along the line IV—IV in FIG. 1.

FIG. 3 illustrates the course. The cycle time of the press 26 is designated by $t_T$. The cycle time $T_E$ of the extruder is in any case less than $t_T$ so that the sheets 39 can be supplied to the press 26 individually. As seen in FIG. 3, it is essential that the run-up time $t_H$ and the deceleration time $t_B$ for the motor 6 and the motors 12 and 15 be equal so that also the run-up of the screws 5 to full operational speed and the run-up from standstill of the metering devices 10 and 14 to full operational speed and correspondingly also deceleration to standstill take place absolutely synchronously. In this way it is possible that the extruder 1 is run with a constant filler content and that the compounding process takes place completely uniformly. The respective triggering is effected by the cycle of the injection molding machine 30, via which are triggered also the drive 22 of the cutting unit 21 and the motor 24 of the conveying device 23.

As far as the mode of operation of the extruder is concerned, the embodiment according to FIG. 2 does not differ from the embodiment according to FIG. 1; in this case, however, triggering of the motor 6 and of the first metering motor 12 and the second metering motor 15 takes place from the side of the injection molding machine 30 i.e., either by the ejection drive 37 or by the motor 33.

It is common to all embodiments that the melt compounded in the extruder 1 does not cool down and need not be heated again in the processing unit or prior to being supplied to the processing unit, but that it can be further processed with the heat absorbed in the extruder 1.

As for the cycle times $t_T$, $t_T \leq 5$ min. and preferably $t_T \leq 2$ min. applies, with $t_T \leq 40$ sec. being especially preferred.

What is claimed is:

1. An installation for the treatment and further processing of thermoplastics, comprising
   an extruder (1), which has
      a housing (2),
      at least one screw (5, 5') disposed in the housing (2),
      an electric motor (6) coupled with the at least one screw (5, 5'), said electric motor having a run-up time $t_H$ and a deceleration time $t_B$, wherein said electric motor is coupled to said screw in a manner to drive said screw when said electric motor is running
      at least one metering device (10, 14) with a metering motor (12, 15), said metering motor having a run-up time $t_H$ and a deceleration time $t_B$,
   a processing unit (26, 30) directly downstream of the extruder (1), said processing unit having a drive (28), said processing unit having cycle time $t_T$,
   a control unit (29), electronically interfaced with the electric motor (6), the metering motor (12, 15), and the drive (28) of the processing unit (26, 30), and
      wherein said control unit is configured and interfaced to: control said drive of said processing unit to intermittently operate for said cycle time $t_T$, control said electric motor and said metering motor so as to trigger their operation in accordance with the cycle time $t_T$, and only trigger the operation of the electric motor and metering motor when a melt strand is ready to be extruded to the processing unit, and
      wherein said metering motor and electric motor have identical run-up and deceleration times.

2. An installation according to claim 1, wherein $t_T \leq 5$ mm. applies to the cycle time $t_T$.

3. An installation according to claim 2, wherein $t_T \leq 2$ min. applies to the cycle time $t_T$.

4. An installation according to claim 3, wherein $t_T \leq 40$ sec. applies to the cycle time $t_T$.

5. An installation according to claim 1, wherein the extruder (1) comprises a first metering device (10) and a second metering device (14).

6. An installation according to claim 1, wherein the extruder (1) comprises an inlet (16) for rovings (17).

7. An installation according to claim 1, wherein the processing unit is a plunger-injection molding machine (30).

8. An installation according to claim 1, wherein the extruder (1) is a twin-screw machine.

9. An installation according to claim 1, wherein the extruder (1) is a twin-screw extruder.

* * * * *